United States Patent [19]

Pisani

[11] Patent Number: 5,064,322

[45] Date of Patent: Nov. 12, 1991

[54] JOINT FOR MODULAR TOOLHOLDER DEVICE OF A TOOL MACHINE FOR THE WORKING OF METALS AND OTHER

[76] Inventor: Gianluigi Pisani, Via Pisana, 122, Scandicci (Firenze), Italy

[21] Appl. No.: 443,891

[22] Filed: Nov. 30, 1989

[30] Foreign Application Priority Data

Nov. 30, 1988 [IT] Italy ................... 9535 A/88

[51] Int. Cl.$^5$ ................... B23C 5/26
[52] U.S. Cl. ................... 409/234; 408/239 A
[58] Field of Search ................... 409/234, 232, 233; 408/239 R, 239 A, 238; 279/1 A, 8

[56] References Cited

U.S. PATENT DOCUMENTS

| | | | |
|---|---|---|---|
| 2,917,975 | 12/1959 | Webster | 409/234 X |
| 2,977,859 | 4/1961 | Glaser | 409/232 |
| 4,617,846 | 10/1986 | Horsch | 409/233 |
| 4,643,623 | 2/1987 | Kondo et al. | 409/232 |
| 4,834,597 | 5/1989 | Andersson et al. | 408/239 A X |
| 4,886,402 | 12/1989 | Pfalzgraf | 409/234 |

FOREIGN PATENT DOCUMENTS

| | | | |
|---|---|---|---|
| 3019970 | 12/1981 | Fed. Rep. of Germany | 409/234 |
| 3540109 | 7/1986 | Fed. Rep. of Germany | 409/234 |
| 1121138 | 3/1986 | Italy . | |
| 7800009 | 8/1979 | Switzerland | 409/234 |
| 1013132 | 4/1983 | U.S.S.R. | 409/234 |
| 2137124 | 10/1984 | United Kingdom | 409/234 |

*Primary Examiner*—William Briggs
*Attorney, Agent, or Firm*—McGlew and Tuttle

[57] ABSTRACT

Tool holder connection arrangement for modular tools holder devices of a tool machine for connecting a first hollow element, provided with an internal threading and having a cylindrical axial seat, to a second hollow element provided with a shank insertable in the cylindrical axial seat of the first element. The connection arrangement includes a shaft having threading engageable with the internal threading of the first hollow element, the shaft defines a seat for receiving a clamping wrench. A tongue arrangement is provided for torsionally blocking the second element relative to the first element. A crown of balls arrangement is provided for axially blocking the second element with respect to the shaft. The shaft includes a circumferential groove and the shank includes a circumferential groove for receiving the crown of balls arrangement. The crown of balls arrangement releases or blocks the second element relative to the first element upon rotation of the shaft in a direction with respect to the first element. A dowel arrangement is provided for torsional blocking of the second element relative to the shaft. The dowel arrangement includes a radial bore through the second element and a head element engaging a groove formed in the shaft, the head element being maintained in engagement with the groove by an elastic pin.

3 Claims, 1 Drawing Sheet

JOINT FOR MODULAR TOOLHOLDER DEVICE OF A TOOL MACHINE FOR THE WORKING OF METALS AND OTHER

FIELD AND BACKGROUND OF THE INVENTION

The present invention relates to a tool holder connection arrangement for a modular tool holder device for a tool machine intended to work metals and other materials.

To meet the every growing demand for flexibility in tool machines with tool holder-changing and blocking devices and with mounts for connection to the machine nose, controlled by numerical control units, manufacturers have been compelled to build devices allowing for interchangeability of the means for the attachment of the tool holder to the machine, whatever its shape. It is also desirable to provide the possibility of varying the type of tool holder according to the required working (boring, milling, tapping) and to provide the possibility of modifying the dimensions of the tool holder, that is, diameter and length, in order to reach all the zones to be worked without altering the rigidity of the whole.

Italian patent 1,121,138 discloses an arrangement with a series of elements for a modular tool holder device. The arrangement is for the working, especially chip-cutting, of metals by a tool machine. The tool cutting machine comprises a plurality of adapters provided with a machine nose mount, a plurality of intermediate elements of different diameter and length and a plurality of tool holder heads. The coupling between any two adjacent elements is carried out by screwing a shank, having cylindrical intermediate portion and a threaded end portion, within an axial seat forming a cylindrical guide and provided with a corresponding threading, and with axial abutment of two flat surfaces of the two elements. Each element may possibly be provided with means for axially adjusting the abutment. Additionally, the diameter of the seat and the shank of a same element can be varied to make up a series of reducing adapters.

However, the chip cutting device works at very high speeds. This is made possible by the higher power available at the spindle of the most recent tool machines. These high speeds generate a work torque at the tool tip which exceeds the tightening torque developed by the friction between the flat contact surfaces of two contiguous elements and determined by the screwing of the shank threaded portion into the corresponding axial seat. This causes a further screwing of the joint and hinders or even prevents the screwing off of the joint upon the disassembly of the matched modular parts, thus altering the operating capacities of the whole unit.

It is also known from documents DE=3540109 and GB 2,127,124 to provide a joint for blocking an adapter and a tool holder one to the other. The joint of the first document utilizes a journal made up of two parts of different diameters, each part being provided with a threading, and the two threadings being of different pitch. The joint of the second document utilizes a journal of one diameter which is only provided with two threadings of different pitch. Moreover, the joint described in the documents uses a tongue or a pin for the torsional blocking between the adapter and the tool holder.

On the other hand, the two threadings do not seem capable of ensuring the axial irremovability and ensuring the fixed position of the tongue. Further, the pin is not able to change the relative orientation between the adapter and the tool holder. Moreover, the joints disclosed in the documents do not allow the fixing of the journal to the tool holder nor the passage of oil for cooling the tool.

SUMMARY AND OBJECT OF THE INVENTION

The present invention has the object of eliminating the above mentioned drawbacks by providing a connection arrangement for the connection of any two adjacent elements of a modular device of the type mentioned above, which is capable of absorbing the variable work torques developing at the tip of the tool and avoiding a crucial increase in the optimal tightening torque.

This result has been achieved, according to the invention, by providing a shaft, able to fit into the axial seat forming the cylindrical guide of a first hollow element. A recess is provided for tightening by a wrench passing through the first element. On the other end of the shaft the hollow shank of the second element is rotatively mounted, which shank is axially blocked and inserted into the cylindrical guide and comprises means for blocking the rotation relative to the first element and to the joint shaft.

Advantageously, the means for the rotation of the shank of the second element on the joint shaft are made up by a balls crown and the means for blocking the rotation of the second element are made up of a plurality of prismatic recesses provided on the side surface of the second element in correspondence of the surface abutting with the first element, and of a tongue which can be rigidly blocked by a screw within a seat provided in correspondence of the contact surface of the first element so as to engage any of the the prismatic recesses.

For the fitting of the joint to the attachment cones already available on the market and not provided with the seat for the blocking tongue, there are provided a plurality of prismatic recesses formed in the side surface of the rear end of the joint shaft and a blocking dowel inserted into a corresponding hold going radially through the second element.

Under these conditions, the work torque is contrasted by the tightening torque alone, that is, by the friction between the contact surfaces of the firs and second elements, thus allowing a rigid coupling between the shaft and the second element besides an operative capacity equivalent to that of the modular devices previously used and already described in the above mentioned patent.

The solution proposed by the present invention makes it possible to build a joint or tool holder connecting means which maintains the screwing-operated mounting, by roto-translation motion, of a shank connected to the second element, within an axial seat forming a cylindrical guide of the first element, by which allows, once the optimal tightening torques developed by the friction generated by the contact surface of the two elements is reached and in case the work torque at the tip of the tool exceeds the tightening torque, that the latter be absorbed by the element provided for blocking the rotation of the second element. In this way it is possible to maintain the optimal tightening torque unchanged while ensuring an easy and reliable disassembly of the two elements at all times. Moreover, the two prismatic recesses allow the orientation, that is, the indexing, of the tool carried by the second element with respect to the first element, for example, the cone for the mounting to the machine nose, within a certain arc of a circle whose extension depends on the number of recesses. Finally, all the characteristics of modularity and rigidity of the elements, as previously imposed, are maintained with the possibility of also adapting the tool holder connection means to already existing elements which are not provided for the tool holder connection means.

BRIEF DESCRIPTION OF THE DRAWINGS

These and further advantages and characteristics of the invention will be more and better understood by any technician skilled in the field by the following description in conjunction with the attached drawings given only as a practical example of the invention, but not to be considered in a limitative sense; in which.

DETAILED DESCRIPTION OF THE PREFERRED EMBODIMENT

Figure 1:
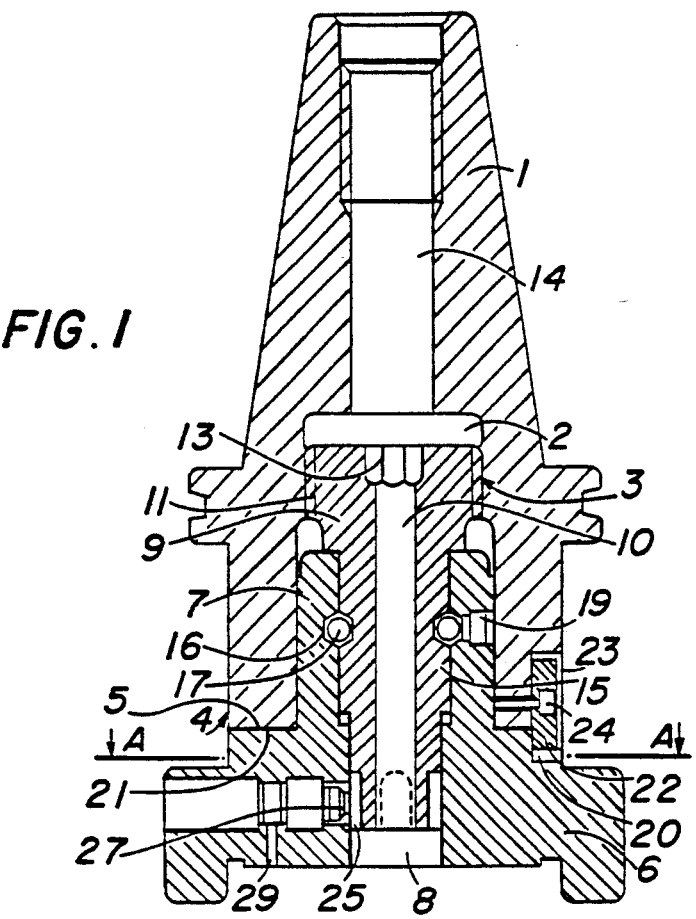
FIG. 1 is a longitudinal sectional view of a tool holder connector device according to the invention, for the coupling between a mounting cone and a support of tool holder head.
Figure 3:
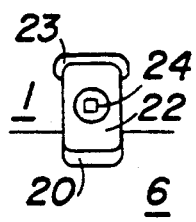
FIG. 3 is a detailed front view of the rotation-blocking element according to the invention.
Figure 2:
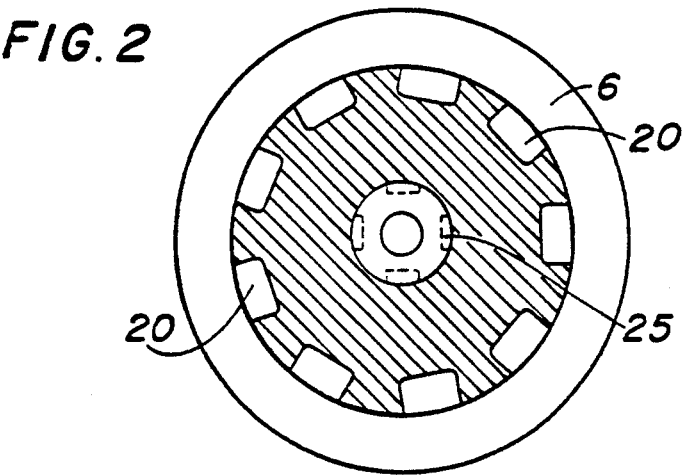
FIG. 2 is a transverse sectional view taken along line A—A of FIG. 1.

With reference to the Figures of the attached drawings, a tool holder connection arrangement for a modular tool holder device for a tool machine for working metals or other material is provided. The tool holder connection device is intended to connect to a hollow cone 1 for mounting it on the machine nose. The hollow cone 1 includes an axial seat 2 with female threading 3. A cylindrical guide 4 is provided with axially abutting shoulder 5. An element 6 is provided for the support of a tool, and includes a cylindrical shank 7 with an axial hole 8.

The tool holder connection device comprises a shaft 9 having the front end provided with a threading 11 connectable to threading 3 of the axial seat 2 of the cone 1. An axial seat is provided in shaft 9 having polygonal cross-section 13 for housing the corresponding end of a tightening spanner (not shown) to be introduced through the axial hold 14 of the mounting hold 1. The stem 15 of the shaft 9 is provided with a groove, having an external circumferential polygonal cross-section, which delimits, in cooperation with a symmetrical internal circumferential groove of the shank 7 of support 6, a seat 16 for a crown of balls 17 which are kept in their seat by a screw dowel 19 fitted into a corresponding radial hold going through the shank 7. Such crown of balls 17 allows the free rotation of the support 6 on shaft 9 but without axial translation.

The shaft 9 is advantageously provided with an axial hole 10, throughout the length thereof, to allow for the inflow of cooling fluid for the cone 1 and thus the delivery of same fluid to the tool borne by the support 6.

A set of prismatic recesses 20, nine in the example, are provided in the upper side surface of the support 6 in the vicinity of the flat surface 21 which contacts the shoulder 5 of the mounting cone. One of these recesses is apt to be engaged by a tongue 22 housed within a corresponding cavity 23 provided in the lower side surface of cone 1 and anchored to the cone 1 by a blocking screw 24.

The mounting of the tool holder connection device is carried out as follows. The shaft 9, with the support 6 fitted thereon and with the balls 17 previously housed within the groove 16, is introduced into the axial seat 2 of the mounting cone 1. A tightening spanner introduced through the hold 14 of cone 1, as far as to engage the cavity 13 of the shaft 9, is rotated so as to screw the threaded end 11 of the shaft 9 into the female threading 3 of seat 2. The screwing of shaft 9, in cooperation with the crown of balls 117, causes the shank 7 of the support 6 to translate within the cylindrical guide 4 of seat 2 which causes the tongue 22 to go not a corresponding recess 20 of support 6 so as to block the rotation thereof. The tightening keeps on until it reaches the optimal torque developed by the friction generated between the surfaces 5 and 21. The recess 20, chosen for the orientation and indexing of the tool carried by the support 6, may easily be positioned in correspondence of the blocking tongue 22 thus ensuring a safe and accurate positioning all the time. During the tool work phase, the work torque at the end of the tool is absorbed by the tightening torque developed by the friction between the contact surfaces 5 and 21 upon the tightening, and the possible higher torque developed during a chip-cutting work is absorbed by the tongue 22 without increase of the tightening torque To obtain the coupling of the tool holder connection device to the mounting cones or other elements already present on the market and not provided with the recess 23 for the insertion of the blocking tongue 22, there is provided, according to the invention, a plurality of prismatic recesses 25, four in the example, formed in the side surface of the rear end of shaft 25. One of the recesses 25 is intended to be engaged by a dowel 27 screwed into a corresponding radial hole going through the support 6 and blocked therein by an elastic pin 29 inserted into a corresponding axial hole of the support 6.

In this way, the conditions existing connection arrangements described above are restored, thereby allowing a rigid connection between the shaft 9 and support 6 through the combined action of the crown of balls 17 and of the blocking tooth 27. The work torque is then absorbed as in the the devices by the friction generated by the tightening between the contact surfaces of the two elements.

It is understood that such connection arrangement may be provided rather than between a mounting cone and a tool holder head support, between any two elements of a modular device for tool machines, for example on intermediate or reducing elements.

While a specific embodiment of the invention has been shown and described in detail to illustrate the application of the principals of the invention, it will be understood that the invention may be embodied otherwise without departing from such principals.

I claim:

1. A tool holder connection arrangement for a modular tool holder device of a tool machine for connecting a first hollow element, provided with an internal threading and having a cylindrical axial seat, to a second hollow element provided with a shank insertable in the cylindrical axial seat of the first element, comprising: a shaft having threading engageable with the internal threading of the first hollow element, said shaft defining a seat for receiving a clamping wrench; tongue means for torsionally blocking the second element relative to the first element; crown of balls means for axially blocking the second element with respect to said shaft, said shaft including a circumferential groove and said shank including a circumferential groove for receiving said crown of balls means, said crown of ball means for releasing or blocking the second element relative to the first element upon rotation of said shaft in a direction with respect to said first element; and, dowel means for torsional blocking of said second element relative to said shaft, said dowel means including a radial bore through said second element and a head element engaging a groove formed in said shaft, said head element being maintained in engagement with said groove by an elastic pin.

2. A tool holder connection arrangement according to claim 1, wherein said tongue means includes a tongue element axially projecting from said first element, said tongue element being connected to said first element by a screw, said grooves of said second element being formed angularly equidistant about the periphery of said second element, said tongue being insertable into one of said grooves.

3. A tool holder connection arrangement according to claim 1, wherein said shaft includes an axial hole forming a duct for flow of cooling fluid from the first element to the second element and up to a tool.

* * * * *